United States Patent [19]
Ficheux et al.

[11] 4,068,741
[45] Jan. 17, 1978

[54] ELEVATOR MOTOR CONTROL SYSTEM FOR A.C. INDUCTION MOTOR

[75] Inventors: Rene Ficheux; Francois Ronsin, both of Paris, France

[73] Assignee: United Technologies Corporation, Hartford, Conn.

[21] Appl. No.: 659,396

[22] Filed: Feb. 19, 1976

[30] Foreign Application Priority Data

Mar. 20, 1975 France .............................. 75 08769

[51] Int. Cl.² .............................................. B66B 1/30
[52] U.S. Cl. .................................... 187/29 R; 318/46
[58] Field of Search ...................... 187/29; 318/46, 48, 318/63, 86, 87, 382

[56] References Cited

U.S. PATENT DOCUMENTS

| 2,982,897 | 5/1961 | Eastcott | 318/46 |
| 3,011,594 | 12/1961 | Borden | 187/29 |
| 3,687,235 | 8/1972 | Mitsui et al. | 187/29 |
| 3,798,519 | 3/1974 | Habisohn | 318/46 |
| 3,860,093 | 1/1975 | Mitsui et al. | 187/29 |

Primary Examiner—Robert K. Schaefer
Assistant Examiner—W. E. Duncanson, Jr.
Attorney, Agent, or Firm—Robert T. Mayer

[57] ABSTRACT

An alternating current induction motor control system suitable to employ the motor as a hoisting motor for an elevator. The motor includes a high speed winding and a low speed winding, the high speed winding being used for acceleration and the low speed winding for deceleration. The low speed winding is connected in such a way as to rotate the motor in a direction opposite to that in which the high speed winding rotated it. A motion detector is provided to prevent the elevator from moving in the opposite direction after being brought to a stop at a landing.

6 Claims, 2 Drawing Figures

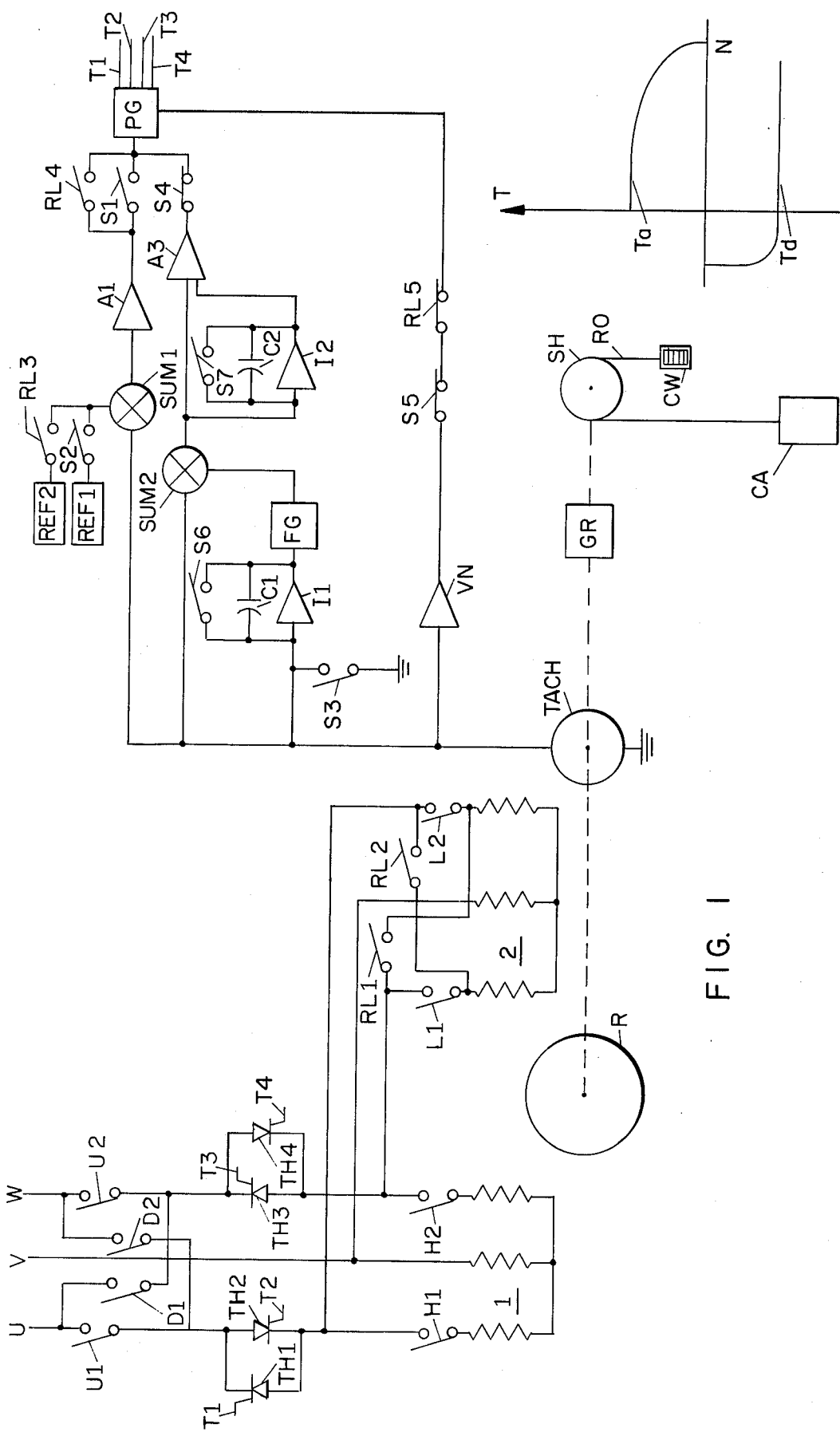
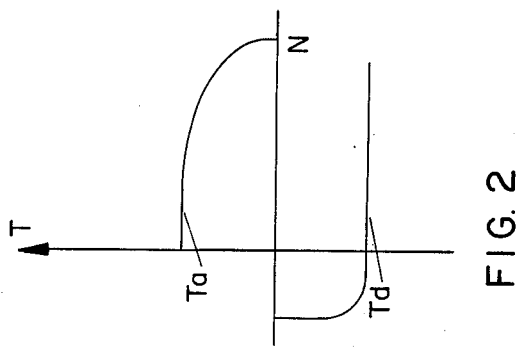
FIG. 1
FIG. 2

ELEVATOR MOTOR CONTROL SYSTEM FOR A.C. INDUCTION MOTOR

This invention relates to an elevator motor control system. More particularly, it pertains to a control system for an alternating current induction motor employed as the hoisting motor for an elevator.

Recently it has become common to utilize alternating current induction motors in geared elevator systems in which direct current motors were formerly employed. Various arrangements have been proposed in which single and plural speed motors are utilized. With a single speed motor, controlled alternating current is applied to both accelerate and decelerate the motor. Deceleration is accomplished by reversing the phase sequence of the current applied to the motor winding. With plural speed motors it has been proposed to apply controlled alternating current to one of the windings to accelerate the motor and to apply controlled direct current to another winding to decelerate the motor.

It is an object of this invention to provide an improved elevator motor control system.

In carrying out the invention there is provided an elevator motor control system in which a three phase A.C. induction motor with fast and slow speed windings is accelerated by having its fast speed windings appropriately connected by switching apparatus to the supply lines of a three phase A.C. voltage source in at least two lines of which are current regulating devices for regulating the magnitude of alternating current applied to said fast speed windings in accordance with a signal representing the difference between a reference speed signal and the output signal of a tachometer generator driven in response to the rotation of said motor, wherein said switching apparatus operates in response to the location of said car at a predetermined distance from a landing at which a stop is to be made to disconnect said fast speed windings from and to connect said slow speed windings to said current regulating devices to receive three phase alternating current from said source in a phase sequence different from that by which said current was applied to said fast speed windings, said switching apparatus in operating also switching the control of said current regulating devices from said difference signal to an error signal derived by comparing said tachometer generator sigal with a deceleration pattern signal produced by a function generator in response to the distance the car is calculated to be from said landing at which it is to stop, said calculated distance being represented by a continuously decreasing signal generated by an integrating circuit which integrates the signal produced by said tachometer generator after said car arrives at said predetermined distance and subtracts that integrated signal from a signal representing said predetermined distance.

The invention will be understood from the following description when considered in conjunction with the appended claims and accompanying drawing in which FIG. 1 is a schematic diagram of an elevator employing the motor control system of the invention, and FIG. 2 is a diagram showing the speed-torque characteristics of a motor suitable for use in the motor control system of the invention.

No coil circuits are shown in the drawing for any of the switches referred to in the description, it being understood that anyone skilled in the art would know how suitably to energize the coils of the described switches from the description. Contacts of all switches are illustrated in the condition in which they would be if their respective switches are in their unactuated condition.

Referring now to FIG. 1, there is illustrated a three phase alternating current induction motor with two sets of stator phase windings, a fast speed winding 1 and a slow speed winding 2. Each is connected through contacts H1, H2 or L1, L2 of an associated fast or slow speed switch to the three phase supply lines $u$, $v$ and $w$. These H and L contacts are arranged so as to reverse the phase sequence of the voltage applied to low speed winding 2 from that applied to high speed winding 1.

Also connected in the three phase supply lines are contacts U1, U2 and D1, D2 of up and down reversing switches for reversing the phase sequence of the voltage applied to both the fast and slow speed windings and consequently for reversing the direction of rotation of the motor. The contacts RL1, RL2 of a releveling switch connect the slow speed winding 2 to the three phase supply with the same phase sequence as the H1 and H2 contacts of the fast speed switch provide for fast speed winding 1. This permits the slow speed winding to be employed for releveling should rope stretch or contraction change the position of the elevator after it has been stopped at a landing.

Connected in each of two of the three supply lines is a respective pair of back to back thyristors TH1, TH2 and TH3, TH4 for controlling the magnitude of alternating current applied to windings 1 and 2. Gate pulses for causing the thyristors to conduct are provided by pulse generator PG and applied along lines T1-T4 which are not shown connected to the thyristors in the drawing for purposes of simplification.

A gear reduction unit GR connects the shaft of the motor rotor R to elevator sheave SH over which ropes RO pass from car CA to counterweight CW. Tachometer generator TACH is connected to the shaft of the motor for rotation with it to produce voltages representative of the speed of the motor. Also mounted on the motor shaft is a flywheel and a typical brake drum neither of which are shown in the drawing to simplify it. The output of tachometer generator TACH is connected to an input of summing circuit SUM1. The other input of circuit SUM1 is connected through contacts S2 of a starting and stopping switch to a first reference speed signal generator REF1 and through contacts RL3 of the releveling switch to a second reference speed signal generator REF2. The output of summing circuit SUM1 is connected to amplifier A1 whose output is connected by contacts S1 of the starting and stopping switch and contacts RL4 of the releveling switch to the input of pulse generator PG.

The output of tachometer generator TACH is also connected to the input of a second summing circuit SUM2 and through contacts S3 of the starting and stopping switch to ground, as well as to the input of integrator circuit I1. Contacts S6 of the starting and stopping switch are connected in parallel across condenser C1 of the integrator I1. The output of this integrator circuit is applied to the other input of summing circuit SUM2 after passing through function generator FG. The output of summing circuit SUM2 is connected to second integrator circuit I2 and to one input of amplifier A3, the other input of which is connected to the output of integrator I2. Contacts S7 of the starting and stopping switch are connected in parallel across condenser C2 of integrator I2. The outut of amplifier A3 is connected to pulse generator PG through contacts S4 of the starting and stopping switch.

Also connected to pulse generator PG through contacts S5 of the starting and stopping switch and contacts RL5 of the releveling switch is the output of amplifier VN which receives the output of tachometer generator TACH and operates as a motion detector to shut pulse generator PG off when the elevator is brought to a stop at a landing.

In operation, upon the generation of a signal to start in a particular direction contacts U1 and U2 or D1 and D2 of the appropriate reversing switch are closed as are contacts H1 and H2 of the fast speed switch H to connect fast speed winding 1 to the three phase supply lines $u$, $v$ and $w$ two of which are so connected through thyristors TH1-TH4. Also operated is the starting and stopping switch to its actuated condition to close contacts S1 and S2, S3, S6 and S7 and to open contacts S4 and S5. As a result the amplified difference between the reference speed signal of generator REF1 and the outut signal of tachometer generator TACH produced by amplifier A1 controls the gate pulses of pulse generator PG. In this way the motor accelerates in accordance with the predetermined pattern of the reference speed signal to generator REF1.

As elevator car CA approaches a landing at which it is desired that it stop a signal to stop is generated at stopping distance from the landing in any well known manner. This is used to cause the starting and stopping switch to operate to its unactuated condition to open contacts S1, S2, S3, S6 and S7 and to close contacts S4 and S5. In addition the fast speed switch is operated to its unactuated condition to open contacts H1 and H2 disconnecting fast speed winding 1 from the three phase supply and the slow speed switch is operated to its actuated condition to close contacts L1 and L2 connecting slow speed winding 2 to the supply. The phase sequence of the supply to winding 2 is different than that to winding 1 so that the slow speed winding produces a torque opposite to that produced by winding 1 which decelerates the motor. The flywheel, not shown, tends to counteract the deceleration torque.

The magnitude of the alternating current applied to slow speed winding 2 to decelerate the elevator is controlled by the output signal from amplifier A3. This signal represents the error between the actual speed signal from tachometer generator TACH and the reference speed signal produced by function generator FG plus the integral of that error produced by integrator circuit I2.

The reference speed signal from function generator FG is produced in accordance with the distance car CA is calculated to be from the landing at which it is to stop. This distance is calculated by applying the output from tachometer generator TACH to integrator I1 from the time the car arrives at stopping distance from the landing until it stops at that landing. This generates a signal equal to the distance the car has traveled from the stopping distance point. By subtracting this signal from a fixed one scaled to represent the stopping distance a decreasing signal is produced representing the calculated distance car CA is from the landing. In response to this, function generator FG produces a reference speed signal which provides the desired deceleration pattern which in accordance with well known elevator control techniques is suitably a function of the square root of twice the calculated distance multiplied by the desired deceleration rate.

As the elevator is brought nearly to a stop at the landing the output of tachometer generator TACH decreases substantially to zero. This output is compared in an absolute manner with a bias signal having a suitably minimum magnitude so that when the two signals are equal amplifier VN is caused to produce an output which shuts pulse generator PG off. This prevents the continued application of current to slow speed winding 2 which otherwise might cause the motor to reverse. Similarly the typical electromechanical brake (not shown) is suitably applied to brake the motor in a desirable manner as the output of tachometer generator TACH decreases substantially to zero.

If while stopped at a landing car CA should move away from it because of rope stretch or contraction due to changing loads the releveling switch is actuated in any suitable well known manner to close its contacts RL1, RL2, RL3 and RL4 and to open its contacts RL5 to enable a releveling operation in accordance with the difference between the pattern of reference speed signal generator REF2 and the actual speed signal from tachometer generator TACH.

A motor suitable for use in the control system of the invention desirably possesses the speed-torque characteristics shown in the diagram of FIG. 2. The maximum torque it is capable of producing for deceleration ($Td$) should be approximately the same as the maximum torque it can produce for acceleration and this deceleration torque should be substantially constant throughout the deceleration speed range.

What is claimed is

1. An elevator motor control system in which a three phase A.C. induction motor with fast and slow speed stator windings is accelerated by having its fast speed windings appropriately connected by switching apparatus to the supply lines of a three phase A.C. voltage source in at least two lines of which are current regulating devices for regulating the magnitude of alternating current applied to said fast speed windings in accordance with a signal representing the difference between a reference speed signal and the output signal of a tachometer generator driven in response to the rotation of said motor, wherein said switching apparatus operates in response to the location of said car at a predetermined distance from a landing at which a stop is to be made to disconnect said fast speed windings from and to connect said slow speed windings to said current regulating devices to receive three phase alternating current from said source in a phase sequence different from that by which said current was applied to said fast speed windings, said switching apparatus in operating also switching the control of said current regulating devices from said difference signal to an error signal derived by comparing said tachometer generator signal with a deceleration pattern signal produced by a function generator in response to the distance the car is calculated to be from said landing at which it is to stop, said calculated distance being represented by a continuously decreasing signal generated by an integrating circuit which integrates the signal produced by said tachometer generator after said car arrives at said predetermined distance and subtracts that integrated signal from a signal representing said predetermined distance.

2. An elevator motor control system according to claim 1, wherein a motion detector operates in response to the reduction in the speed of said elevator to a predetermined magnitude to prevent said current regulating devices from providing further current to said slow speed winding.

3. An elevator motor control system according to claim 2, wherein said motion detector receives the output signal of said tachometer generator and operates upon a predetermined relationship existing between said output signal and bias signal having a suitably prescribed minimum magnitude.

4. An elevator motor control system according to claim 3, wherein a second integrating circuit produces a signal which is a function of the integral of said error signal, said integrated error signal also being effective to control said current regulating devices after said slow speed windings are connected to said devices.

5. An elevator motor control system according to claim 4, wherein upon said car being located at a landing and moving out of predetermined registry with that landing and moving out of predetermined registry with that landing said switching apparatus is operable to connect said slow speed windings to said current regulating devices to enable said devices to apply controlled alternating current to said slow speed windings sufficient to restore said car to said predetermined registry.

6. An elevator motor control system according to claim 5, wherein said function generator produces an output signal which is a function of the square root of twice said calculated distance multiplied by the desired rate of deceleration of the car.

* * * * *

UNITED STATES PATENT OFFICE
CERTIFICATE OF CORRECTION

PATENT NO. : 4,068,741
DATED : January 17, 1978
INVENTOR(S) : Rene Ficheux and Francois Ronsin It is certified that error appears in the above-identified patent and that said Letters Patent are hereby corrected as shown below:

Title Page, Left Column: After "Assignee:" - "United Technologies Corporation, Hartford, Conn." should be --Otis Elevator Company, New York, N.Y.--.

Col. 6, Cl. 5, Line 2 : After landing delete "and moving out of predetermined registry with".

Col. 6, Cl. 5, Line 3 : Delete "that landing".

Signed and Sealed this

Twenty-third Day of May 1978

[SEAL]

Attest:

RUTH C. MASON
Attesting Officer

LUTRELLE F. PARKER
Acting Commissioner of Patents and Trademarks